Figure 1:
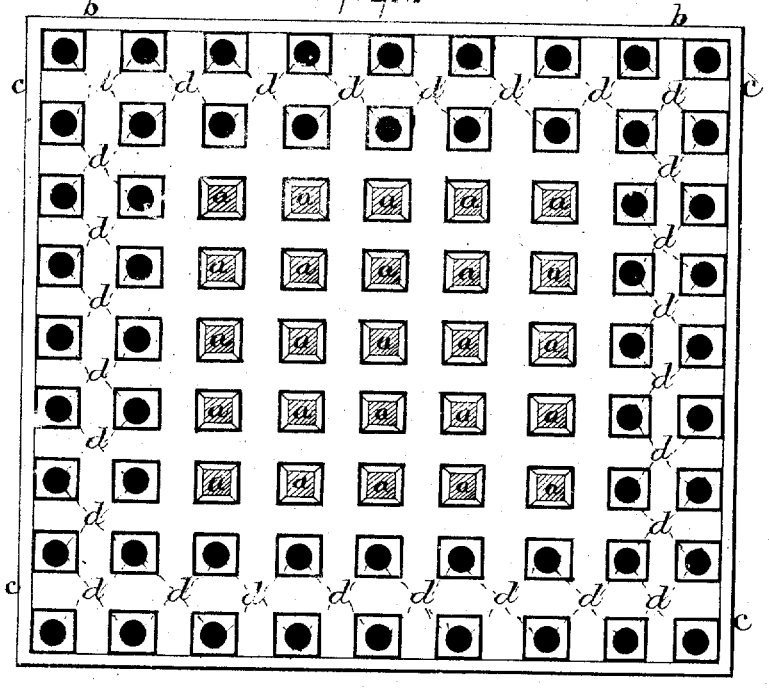

G. A. KEENE.

Carriage-Steps.

No. 6,229. Reissued Jan. 12, 1875.

WITNESSES:

Jas. E. Hutchinson

John R. Young

INVENTOR.

George A. Keene, by

Prindle and Co. his Attys

UNITED STATES PATENT OFFICE.

GEORGE AUGUSTUS KEENE, OF LYNN, MASS., ASSIGNOR, BY MESNE ASSIGNMENTS, TO THE RUBBER STEP MANUFACTURING COMPANY.

IMPROVEMENT IN CARRIAGE-STEPS.

Specification forming part of Letters Patent No. 65,754, granted June 11, 1867; reissue No. 6,229, dated January 12, 1875; application filed November 27, 1874.

*To all whom it may concern:*

Be it known that I, GEORGE AUGUSTUS KEENE, formerly of Newburyport, and now of Lynn, in the county of Essex and State of Massachusetts, have invented a new and useful Improved Tread for Steps; and I do hereby declare that the following is a full, clear, and exact description of the construction and operation of the same, reference being had to the accompanying drawing forming a part of this specification, sufficient to enable others skilled in the art to construct my improvement without other invention or experiment.

To avoid and obviate the common difficulty and danger of entering and leaving carriages inrainy, snowy, or dirty weather, I invented a tread for steps, which forms the subject of this application.

My invention consists in the application to the tread of a step, by appropriate and permanent means, of rubber, formed upon its surface into elevations and depressions, or, in other words, in permanently protecting, plating, or covering the step with a rubber clothing having an undulating surface, whereby projections of rubber are presented upward to receive the pressure of the foot; also, in providing a permanent surface to the step, resilient under the foot, and by the arrangement of the rubber with a surface of an undulating, corrugated, or shirred section, doing this with greater efficiency and cheaper than it could be done by using the same amount of rubber of uniform thickness, or even by using a greater amount. The coating of rubber is somewhat adhesive to the foot, not permitting slipping in dry or wet weather, while in sleety or snowy weather, although ice will form and adhere, yet, when trodden on, the "give" of the rubber under compression breaks and loosens the ice under foot, and on removal of the pressure of the foot, the resiliency of the rubber further loosens it, so that ice and snow so frozen on as to require an ice-chisel or other cutting instrument to remove from stone, wood or iron, is so broken up by the inherent resiliency of the rubber step as to be readily brushed off. The alternation of elevations and depressions of the rubber surface enhances the number of points of attack beneath the icy cover, and gives a better result than if the rubber were all as thick as the elevated parts, while it is cheaper and of more responsive resiliency.

Various ways may be conceived in which the attachment may be made. The sheet of prepared rubber may be cemented directly to the ordinary step, or it may be fastened to a suitable arrangement of straps, and strapped to the ordinary step, or it may be affixed in the following manner, which I conceive to be by far the best: I attach to a plate of iron or other metal, shaped as may be desired, either round, square, or oval, or of any convenient form, a quantity of rubber stock, and compress the rubber into a mold of such form as to give an intaglio of alternating elevations and depressions to the rubber surface, and then vulcanize. This will give a plate completely plated on its wearing-surface with numerous elevations, ridges, or ribs of vulcanized rubber. The depressed portions of the surface may be perforated to allow the escape of dirt.

Figure 2:
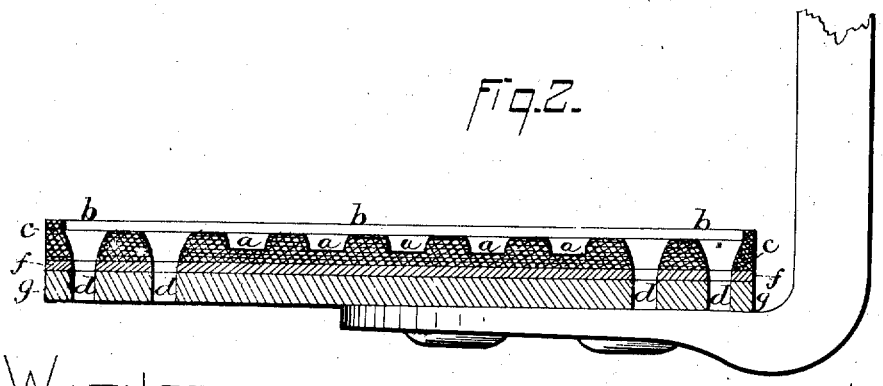

In the drawings, Figure 1 is a plan, and Fig. 2 is a section, of such an execution of my invention. The depressed portions are lettered *a*. The elevated portions are lettered *b c*. Perforations *d* are made clear through the plate *f*, upon which the rubber is vulcanized. The ordinary step is shown at *g*, and the fastenings riveting the rubber-covered plate to the carriage arm or bracket, or to the ordinary step, are shown at *e*. This metallic foundation-plate *f* gives great stability and constructive firmness to the tread and its fastenings to the fixed parts of a carriage, and even allows it to be used as a substitute for the plate *g* of the ordinary step.

It will be observed that the rubber is everywhere supported by the iron plate, and that the upper iron surface is covered by the rubber.

I claim as my invention—

1. A plating of india-rubber, in combination with and firmly attached to the step of a carriage, substantially as and for the purpose described.

2. In combination with a bracket or arm projecting from the carriage, a metallic plate, plated on its upper surface with india-rubber, substantially as described.

3. In combination with a plate, firmly attached to the step-bracket or arm of a carriage, an upwardly-presenting resilient rubber plating, firmly attached to said plate, substantially as described.

4. In combination with a plate, firmly attached to the step-bracket or arm of a carriage, a wearing-surface of upwardly-presenting resilient projections, firmly attached to said plate, substantially as described.

5. In combination with a metallic plate, a rubber surface, firmly affixed thereto, to be applied to a step, substantially as and for the purpose described.

6. A plating of resilient material, with alternating elevations and depressions, attached to and forming the wearing-part of a carriage-step, substantially as described.

7. As a tread for steps, a plating of resilient material, vulcanized to a plate, and covering the upper surface of the same, substantially as described.

8. The combination of a series of upwardly-presenting resilient projections, forming a wearing-surface, a metallic plate, the upper surface of which is below the upper surface of said projections, and a step to which said plate is firmly affixed, substantially as and for the purpose described.

9. In combination with a step, a series of upwardly-presenting vulcanized india-rubber projections, firmly affixed thereto by a metallic plate, substantially as described.

GEO. A. KEENE.

Witnesses:

FRANCIS A. SAWYER,
F. F. RAYMOND.